(12) United States Patent
Kazmierski et al.

(10) Patent No.: US 11,054,580 B2
(45) Date of Patent: Jul. 6, 2021

(54) NON-IMAGING LENS ASSEMBLY DESIGN FOR EFFICIENT POWER COUPLING FROM MULTIMODE FIBER TO SMALL-AREA PHOTODETECTORS

(71) Applicant: X DEVELOPMENT LLC, Mountain View, CA (US)

(72) Inventors: Andrei Kazmierski, Pleasanton, CA (US); Nam-hyong Kim, San Jose, CA (US); Devin Brinkley, Redwood City, CA (US); Baris Ibrahim Erkmen, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/818,183

(22) Filed: Mar. 13, 2020

(65) Prior Publication Data

US 2020/0241208 A1    Jul. 30, 2020

Related U.S. Application Data

(63) Continuation of application No. 16/256,347, filed on Jan. 24, 2019, now Pat. No. 10,627,577.

(51) Int. Cl.
| | |
|---|---|
| *G02B 6/36* | (2006.01) |
| *G02B 6/32* | (2006.01) |
| *F21V 8/00* | (2006.01) |
| *G02B 9/04* | (2006.01) |
| *G02B 27/09* | (2006.01) |

(52) U.S. Cl.
CPC .............. *G02B 6/32* (2013.01); *G02B 6/0005* (2013.01); *G02B 9/04* (2013.01); *G02B 27/0955* (2013.01)

(58) Field of Classification Search
CPC .......... G02B 6/32; G02B 6/0005; G02B 9/04; G02B 27/0955; G02B 6/4206; G02B 19/0014; G02B 19/0076; H04B 10/11
See application file for complete search history.

(56) References Cited

U.S. PATENT DOCUMENTS

| | | |
|---|---|---|
| 3,476,463 A | 11/1969 | Kreuzer |
| 4,854,706 A | 8/1989 | Claus et al. |
| (Continued) | | |

FOREIGN PATENT DOCUMENTS

CN          102520492 A          6/2012

OTHER PUBLICATIONS https://en.wikipedia.org/wiki/Numerical_aperture#:~:text=Numerical%20aperture%20is%20not%20typically,of%20the%20entrance%20pupil%20D%3A&text=thus%20N%20%E2%89%88%2012NA,air%20(n%20%3D%201).*

(Continued)

*Primary Examiner* — Ellen E Kim
(74) *Attorney, Agent, or Firm* — Botos Churchill IP Law

(57) ABSTRACT

An optical communication device is provided that includes a first lens having a first surface and a second surface, a second lens having a third surface and a fourth surface, an optical fiber configured to output light including a plurality of ray bundles, and a photodetector located at the fourth surface of the second lens. The first lens is configured to cause the light output from the optical fiber to form an image at an image plane located at the third surface of the second lens. The second lens is configured to cause subsets of the ray bundles received at the third surface of the second lens to intersect or overlap at the photodetector in a smaller cross-sectional area than at the third surface of the second lens.

20 Claims, 4 Drawing Sheets

(56) References Cited

U.S. PATENT DOCUMENTS

| | | | |
|---|---|---|---|
| 5,844,670 A | 12/1998 | Morita et al. | |
| 6,078,431 A | 6/2000 | Kittaka et al. | |
| 6,333,777 B1 | 12/2001 | Sato | |
| 6,931,181 B2* | 8/2005 | Jewell | G02B 6/4206 |
| | | | 359/819 |
| 7,058,306 B1 | 6/2006 | Smith | |
| 9,341,828 B2 | 5/2016 | Budd et al. | |
| 2004/0264888 A1 | 12/2004 | Go | |
| 2006/0051033 A1* | 3/2006 | Tabata | G02B 6/4206 |
| | | | 385/93 |
| 2008/0137519 A1 | 6/2008 | Ishigami | |
| 2014/0104681 A1* | 4/2014 | Berman | G02B 21/0032 |
| | | | 359/385 |
| 2014/0176903 A1 | 6/2014 | Qiu et al. | |
| 2016/0217990 A1 | 7/2016 | Smith et al. | |
| 2016/0295178 A1 | 10/2016 | Damberg et al. | |
| 2018/0100971 A1 | 4/2018 | Suzuki et al. | |

OTHER PUBLICATIONS

International Search Report and Written Opinion for Application No. PCT/US2020/014359 dated Apr. 30, 2020.
Voelkel, et al., "Laser Beam Homogenizing: Limitations and Constraints", Optical Systems Design, Glasgow, Scotland, United Kingdom, Sep. 2008, 12 pages.

* cited by examiner

NON-IMAGING LENS ASSEMBLY DESIGN FOR EFFICIENT POWER COUPLING FROM MULTIMODE FIBER TO SMALL-AREA PHOTODETECTORS

CROSS REFERENCE TO RELATED APPLICATIONS

This application is a continuation of U.S. application Ser. No. 16/256,347, filed on Jan. 24, 2019, the disclosure of which is incorporated herein by reference.

BACKGROUND

Information can be transmitted over directional point-to-point networks, such as aerospace and other mobile networks. In such networks, links can be formed between pairs of nodes, or terminals at each node, by aiming lens systems of each node pair towards each other. In some implementations, the nodes may transmit and receive optical signals through free space optical communication (FSOC) links.

BRIEF SUMMARY

Aspects of the disclosure provide for an optical communication device comprising a photodetector; an optical fiber configured to relay light; a first lens including a first surface and a second surface and having an image plane, the first lens being configured to receive the light output from the optical fiber, the received light having a first cross-sectional area at the first surface; and a second lens including a third surface positioned at the image plane of the first lens and a fourth surface positioned adjacent to the photodetector, the second lens being configured to receive the light output from the first lens and to output light having a second cross-sectional area at the fourth surface that is smaller than the first cross-sectional area.

In one example, the first surface is a first convex surface, the second surface is a second convex surface, the third surface is a third convex surface, and the fourth surface is a fourth planar surface. In another example, the light includes a plurality of ray bundles, and the second lens is configured to cause at least partial overlap of the plurality of ray bundles at the photodetector. In a further example, the fourth surface is positioned at a focal length of the second lens. In this example, the second lens has a thickness between the third surface and the fourth surface that is equal to the focal length of the second lens. In yet another example, the optical communication device is configured for free-space optical communication.

Other aspects of the disclosure provide for a lens system of an optical communication device. The lens system comprising a first lens including a first surface and a second surface and having an image plane, the first lens being configured to receive light having a first cross-sectional area at the first surface; and a second lens including a third surface positioned at the image plane of the first lens and a fourth surface positioned adjacent to a photodetector, the second lens being configured to receive the light output from the first lens and to output light having a second cross-sectional area at the fourth surface that is smaller than the first cross-sectional area.

In one example, the first surface is a first convex surface, the second surface is a second convex surface, the third surface is a third convex surface, and the fourth surface is a fourth planar surface. In another example, the light includes a plurality of ray bundles, and the second lens is configured to cause at least partial overlap of the plurality of ray bundles at the photodetector. In a further example, the fourth surface is positioned at a focal length of the second lens. In this example, the second lens has a thickness between the third surface and the fourth surface that is equal to the focal length of the second lens.

Further aspects of the disclosure provide for a method of processing an optical signal. The method includes emitting light from an optical fiber of an optical communication device; receiving the light at a first lens; focusing the light using the first lens at an image plane; receiving the light at a second lens positioned at the image plane; focusing the light at a photodetector positioned adjacent the second lens; and operating, by one or more processors, the optical communication device according to the light received at the photodetector.

DETAILED DESCRIPTION

Overview

The technology relates to a non-imaging lens system that focuses light from a multimode fiber on a photodetector for free-space optical communications. The lens system is configured to relay an optical signal from the multimode fiber onto the photodetector that has a diameter smaller than the multimode fiber core. The lens system may more evenly illuminate the photodetector such that more light overall is received at the photodetector while not exceeding a maximum intensity of light at any given location of the photodetector.

The lens system may include a first lens and a second lens positioned between an optical fiber and a photodetector. The first lens may be positioned between the optical fiber and the second lens and may function as a relay lens. The second lens may be positioned between the first lens and the photodetector and may function as a field lens. In addition, the second lens may be positioned in contact with or in close proximity with the photodetector.

The features described in more detail below may provide a lens system that minimizes power loss and maximizes coupling efficiency. As a result, more light may be able to be captured and to be distributed more evenly across the photodetector, thereby preventing damage to the photodetector from a high peak irradiance. This, in turn, may increase the lifetime and input optical power operational range of the photodetector and the FSOC system overall. The described lens system also allows for more relaxed assembly tolerances compared to imaging configurations due to the variability of the dimensions. The magnification required for the first lens may be smaller because the second lens provides additional refraction of light towards the photodetector. Less overall aberration is therefore achievable using the described lens system. In addition, the second lens may serve to protect the photodetector from damage by distributing light more evenly, by filtering the light, or by acting as a physical shield to the photodetector.

Example Systems

Figure 1:
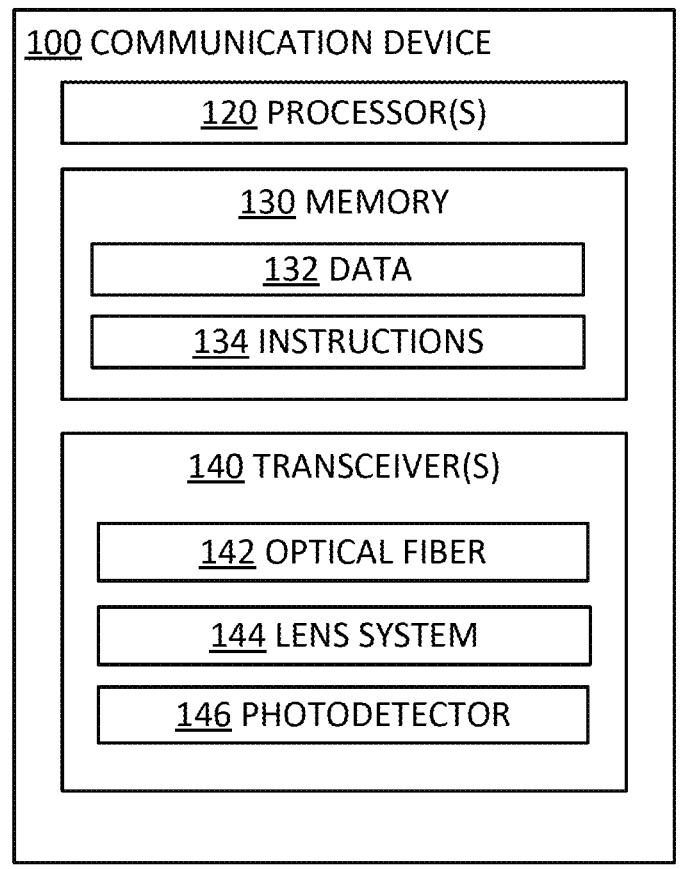
FIG. 1 is a functional diagram of a communication device in accordance with aspects of the disclosure.

FIG. 1 shows an optical communication device 100 that includes one or more processors 120, a memory 130, and one or more transceivers 140. The optical communication device 100 may be configured to form one or more communication links with other optical communication devices. The one or more processors 120 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 120 and memory 130 as being within the same block, it will be understood that the one or more processors 120 and memory 130 may actually comprise multiple processors and memories that may or may not be stored within the same physical housing. Accordingly, references to a processor or computer will be understood to include references to a collection of processors or computers or memories that may or may not operate in parallel.

Memory 130 stores information accessible by the one or more processors 120, including data 132 and instructions 134 that may be executed by the one or more processors 120. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the instructions and data are stored on different types of media.

Data 132 may be retrieved, stored or modified by the one or more processors 120 in accordance with the instructions 134. For instance, although the system and method is not limited by any particular data structure, the data 132 may be stored in computer registers, in a relational database as a table having a plurality of different fields and records, XML documents or flat files. The data 132 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 132 may comprise any information sufficient to identify the relevant information, such as numbers, descriptive text, proprietary codes, references to data stored in other areas of the same memory or different memories (including other network locations) or information that is used by a function to calculate the relevant data.

Instructions 134 may be any set of instructions to be executed directly (such as machine code) or indirectly (such as scripts) by the one or more processors 120. For example, the instructions 134 may be stored as computer code on the computer-readable medium. In that regard, the terms "instructions" and "programs" may be used interchangeably herein. The instructions 134 may be stored in object code format for direct processing by the one or more processors 120, or in any other computer language including scripts or collections of independent source code modules that are interpreted on demand or compiled in advance. Functions, methods and routines of the instructions 134 are explained in more detail below.

Figure 2:
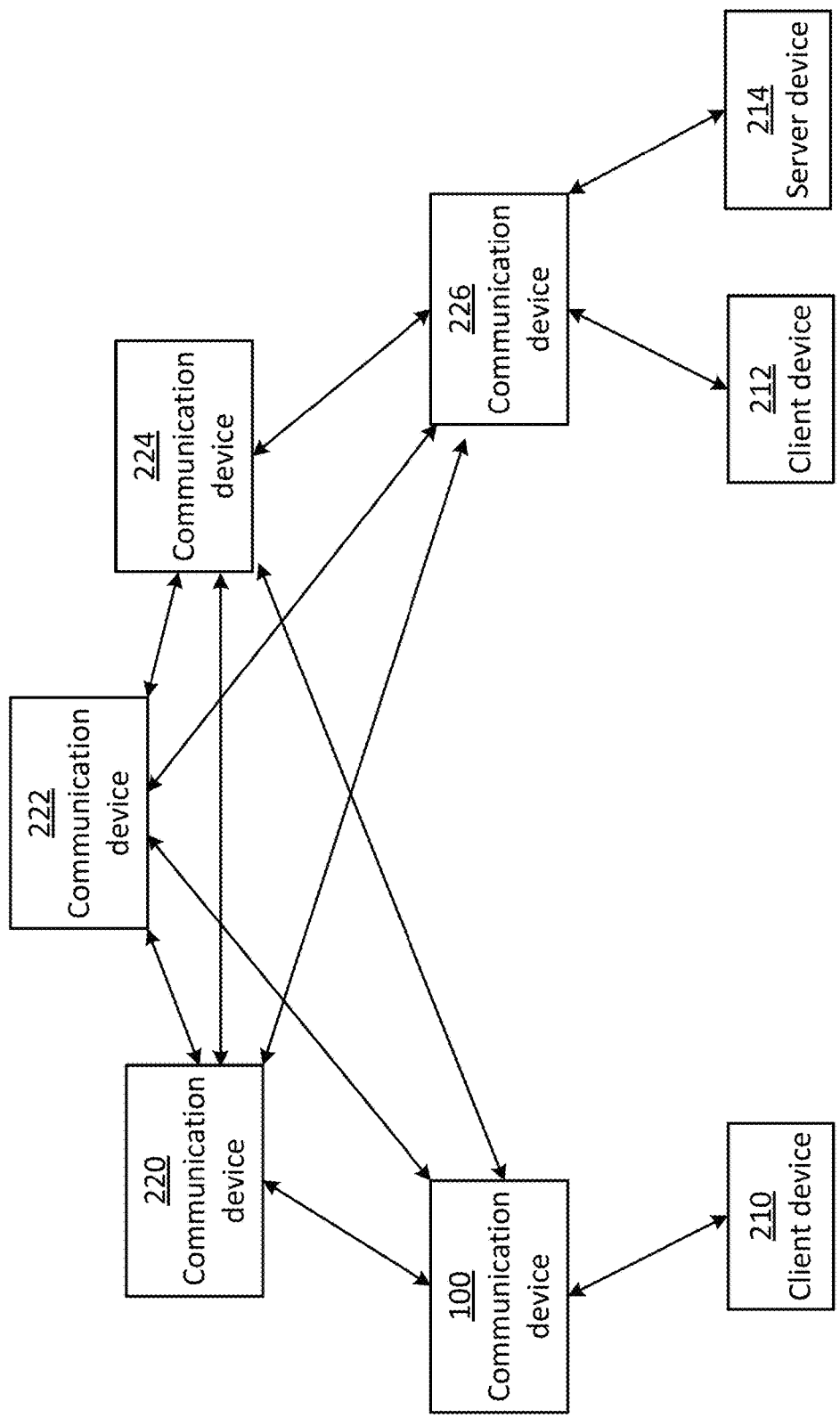
FIG. 2 is a functional diagram of a network in accordance with aspects of the disclosure.

The one or more transceivers 140 may be configured to transmit and receive optical frequencies via cable, fiber, or free space. Additional one or more transceivers may also be included that are configured to transmit and receive radio frequencies or other frequencies. The one or more transceivers 140 may be configured to communicate with one or more other communication devices via one or more communication links. In FIG. 2, the communication device 100 is shown having communication links (illustrated as arrows) with client device 210 and communication devices 220, 222, and 224.

With a plurality of communication devices, the communication device 100 may form a communication network, such as network 200 in FIG. 2. The network 200 includes client devices 210 and 212, server device 214, and communication devices 100, 220, 222, 224, and 226. Each of the client devices 210, 212, server device 214, and communication devices 220, 222, 224, and 226 may include one or more processors, a memory, and one or more transceivers. The one or more processors may be any well-known processor or a dedicated controller similar to the one or more processors described above. The memory may store information accessible by the one or more processors, including data and instructions that may be executed by the one or more processors. The memory, data, and instructions may be configured similarly to memory 130, data 132, and instructions 134 described above. Using the one or more transceivers, each communication device in network 200 may form at least one communication link with another communication device, as shown by the arrows. The communication links may be for optical frequencies, radio frequencies, other frequencies, or a combination of frequencies.

Returning to FIG. 1, the one or more transceivers 140 of the optical communication device 100 includes an optical fiber 142, lens system 144, and a photodetector 146. Optical fiber 142 may be configured to receive light, including an optical signal, transmitted from a remote communication device, such as client device 210 or communication device 220 shown in FIG. 2. The optical fiber 142 may also be configured to relay the light towards the photodetector 146. The photodetector 146 may be configured to detect light received at the surface of the photodetector and may convert the received light into an electrical signal using the photoelectric effect. The one or more processors 120 may be configured to use the photodetector 146 to derive data from the received light and control the optical communication device 100 in response to the derived data.

Figure 3:
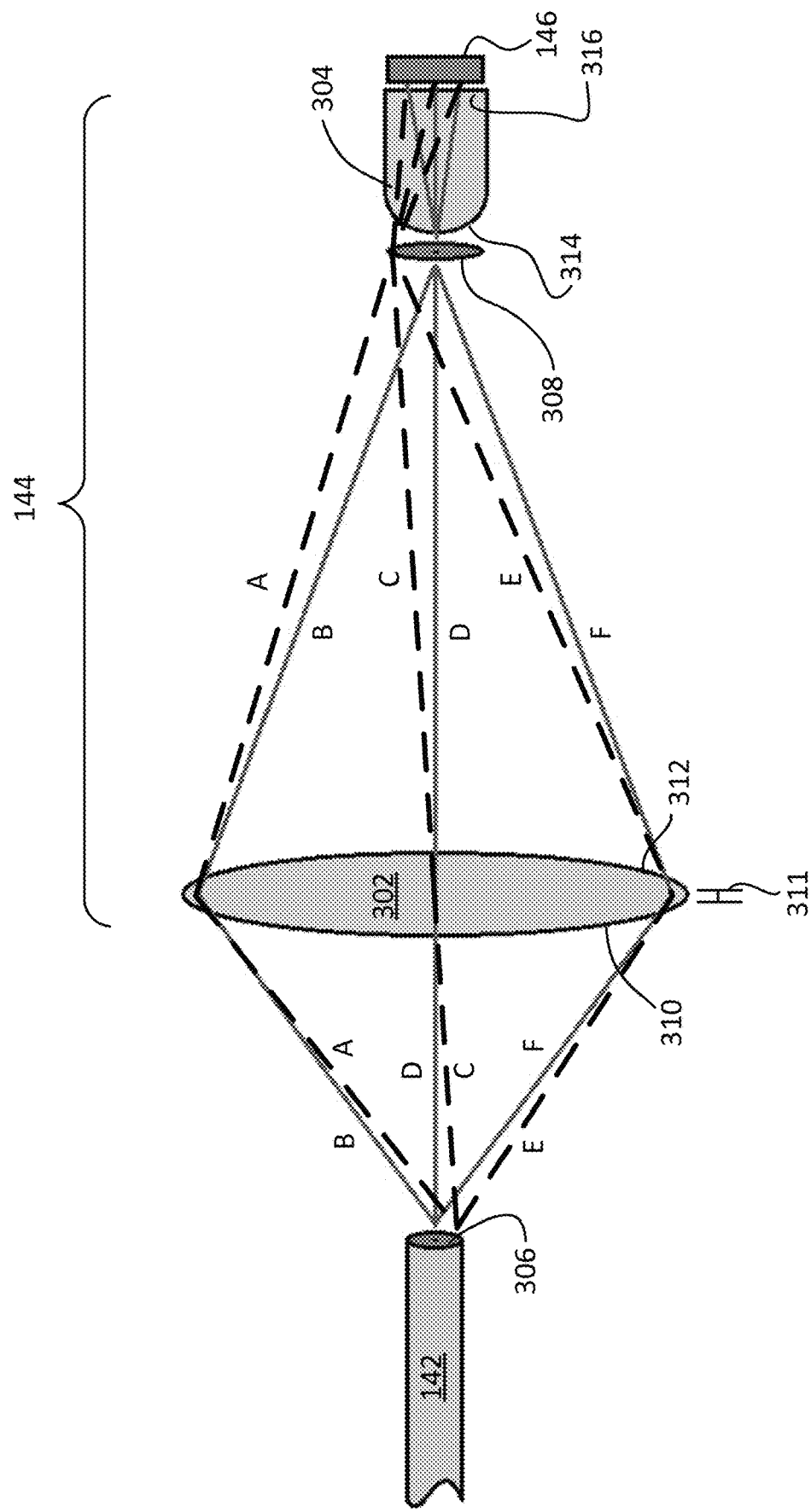
FIG. 3 is a pictorial diagram of a lens system in accordance with aspects of the disclosure.

The lens system 144 is positioned between the optical fiber 142 and the photodetector 146. The lens system 144 is configured to focus the light from the optical fiber 142 onto the photodetector 146. As shown in FIG. 3, the lens system 144 may include a first lens 302 and a second lens 304. The first lens 302 may be positioned between the optical fiber 142 and the second lens 304, and the second lens 304 may be positioned between the first lens 302 and the photodetector 146.

The first lens 302 may be configured to relay light emitted from an output plane 306 of the optical fiber 142 to an image plane 308 that exists between the first lens 302 and the photodetector 146 and focus a cross-sectional area of the light output from the optical fiber 142 onto the second lens 304. For example, the received light may converge as it passes through the first lens 302 due to a greater refractive index of the lens and a curvature of the lens. The first lens may have a first surface 310 configured to receive the light output from the optical fiber 142, a second surface 312 configured to relay the received light towards the second lens, and a thickness 311 between the first surface and the second surface. The first surface and the second surface may be convex surfaces, where a center portion of the surface extends outward in relation to edges of the surface. The first surface 310 may have a first radius of curvature, and the second surface 312 may have a second radius of curvature that is larger than the first radius of curvature. The first lens 302 may have a size that is able to collect all the light emitted from the optical fiber 142. For example, the lens diameter may be at least $2 \tan(\theta)d$, where $\theta$ is a numerical aperture of the optical fiber and d is a distance between the output plane of the optical fiber and the first lens.

Figure 4:
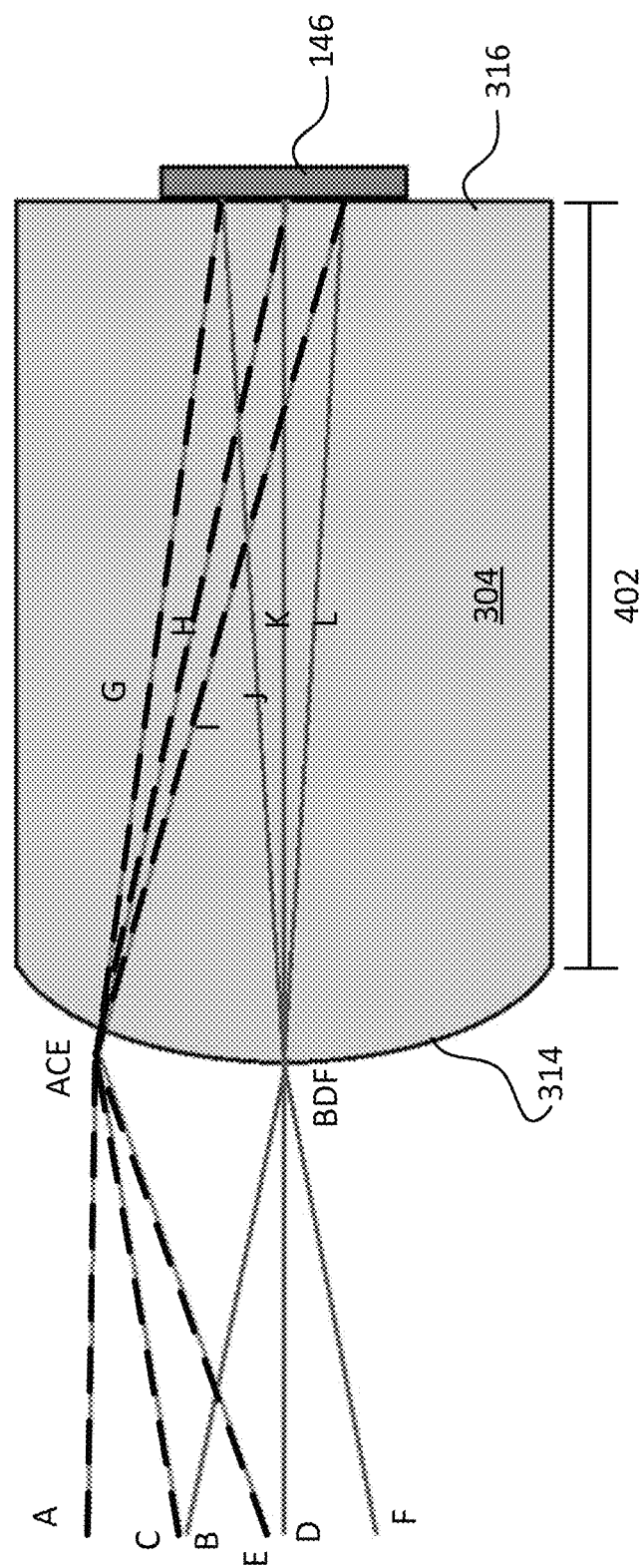
FIG. 4 is a pictorial diagram of a portion of the lens system of FIG. 3 in accordance with aspects of the disclosure.

The second lens 304 may be configured to further focus the cross-sectional area of light output from the first lens 302 onto the photodetector 146. For instance, the second lens 304 may be configured to further converge the light or overlap the light due to a greater refractive index of the lens and a curvature of the lens. For example, as shown in FIGS. 3 and 4, the second lens 304 has a third surface 314, a fourth surface 316, and a thickness 402. The third surface 314 may be a convex surface, and the fourth surface 316 may be planar or flat. The third surface 314 of the second lens may be positioned at or approximately at the image plane 308 of the first lens 302 so as to achieve a highest efficiency of light collection, and the fourth surface 316 may be positioned in contact with the photodetector 146. In some implementations, there may be a small air gap between the fourth surface 316 and the photodetector 146. The third surface 314 may have a third radius of curvature selected to focus the light onto the photodetector 146.

The third surface 314 may cause the cross-sectional area of the light to become less than or equal to an area of the photodetector 146 at the fourth surface 316. The thickness 402 of the second lens may be equal to a focal length of the second lens 304, such that light entering the second lens 304 may be focused on the fourth surface 316 of the second lens and the photodetector 146. The second lens 304 may have a diameter that is at least equal to the diameter of the optical fiber 142 multiplied by the magnification of the first lens 302. The magnification of the first lens 302 may be the distance between the first lens 302 and the second lens 304, divided by the distance between the output plane 306 of the optical fiber and the first lens 302. The second lens 304 may optionally include a material or coating that serves as a wavelength selective (bandpass) filter. Some light may then be filtered as the light passes through the second lens as a result.

Example Operations

In operation, the lens system 144 may be configured to relay light in the following manner. Light is received at the optical fiber 142 of the optical communication device. Referring to FIG. 3, the light is output from the optical fiber 142 and is input onto the first surface 310 of the first lens 302. The light output from the optical fiber 142 includes ray bundles A, B, C, D, E, and F. When the light reaches the first surface 310, the light has a first cross-sectional area at the first surface 310.

The light then passes through the second surface 312 of the first lens and forms an image at the image plane 308, which is at least approximately where the third surface 314 of the second lens 304 is positioned. At the image plane 308, ray bundles A, C, and E intersect or overlap to form the ACE ray bundle, and ray bundles B, D, and F intersect or overlap to form the BDF ray bundle, as shown in FIG. 4. At the third surface 314, the light has a second cross-sectional area that is defined by the magnification of the first lens 302. The second cross-sectional area may be larger, equal to, or smaller than the first cross-sectional area.

The light, including the ray bundles A, B, C, D, E, and F, passes through the second lens 304 and converges at the fourth surface 316 of the second lens, which is at least approximately where the photodetector 146 is positioned. The ACE ray bundle and the BDF ray bundle are split into a plurality of new ray bundles, and the plurality of new ray bundles are refracted to further intersect or overlap at the photodetector 146. For example, the ACE ray bundle is split into at least ray bundles G, H, and I as the light travels through the second lens 304, and the BDF ray bundle is split into at least ray bundles J, K, and L as the light travels through the second lens 304. At the photodetector 146, ray bundles G and J may be at least partially overlapped, ray bundles H and K may be at least partially overlapped, and ray bundles I and L may be at least partially overlapped. The light has a third cross-sectional area at the photodetector 146 that is smaller than the second cross-sectional area. The light may be received fully within the area of the photodetector 146, and may be distributed more evenly across the area of the photodetector 146.

The light received at the photodetector may be processed by the one or more processors 120. The one or more processor 120 may then operate the optical communication device 100 according to the processed light. For example, the one or more processors 120 may determine data from the optical signal in the light or track characteristics of the optical signal. The determined data may be further transmitted through the network 200, or a communication link with a remote communication device may be adjusted according to the tracked characteristics of the optical signal.

Again, the features described herein may provide a lens system that minimizes power loss and maximizes coupling efficiency. As a result, more light may be able to be captured and to be distributed more evenly across the photodetector, thereby preventing damage to the photodetector from a high peak irradiance. This, in turn, may increase the lifetime and input optical power operational range of the photodetector and the FSOC system overall. The described lens system also allows for more relaxed assembly tolerances compared to imaging configurations due to the variability of the dimensions. The magnification required for the first lens may be smaller because the second lens provides additional refraction of light towards the photodetector. Less aberration is therefore achievable using the described lens system. In addition, the second lens may serve to protect the photodetector from damage by distributing light more evenly, by filtering the light, or by acting as a physical shield to the photodetector.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. An optical communication device comprising:
a first lens having a first surface and a second surface;
a second lens having a third surface and a fourth surface;
an optical fiber configured to output light including a plurality of ray bundles; and
a photodetector located at the fourth surface of the second lens,
wherein:
the first lens is configured to cause the light output from the optical fiber to form an image at an image plane located at the third surface of the second lens; and
the second lens is configured to cause subsets of the ray bundles received at the third surface of the second lens to intersect or overlap at the photodetector in a smaller cross-sectional area than at the third surface of the second lens.

2. The optical communication device of claim 1, wherein the first lens is configured to receive the light output from the optical fiber, and
wherein a diameter of the first lens is at least $2\tan(\theta)d$, where $\theta$ is a numerical aperture of the optical fiber and $d$ is a distance between an output plane of the optical fiber and the first lens.

3. The optical communication device of claim 1, wherein the second lens is configured to receive the light output from the first lens and to output light having a cross-sectional area at the fourth surface of the second lens that is smaller than a cross-sectional area at the first surface of the first lens.

4. The optical communication device of claim 1, wherein the first surface is a first convex surface, the second surface is a second convex surface, the third surface is a third convex surface, and the fourth surface is a fourth planar surface.

5. The optical communication device of claim 1, wherein the fourth surface is positioned at a focal length of the second lens.

6. The optical communication device of claim 5, wherein the second lens has a thickness between the third surface and the fourth surface that is equal to the focal length of the second lens.

7. The optical communication device of claim 1, wherein the optical communication device is configured for free-space optical communication.

8. A method of processing an optical signal, the method including:
outputting, by an optical fiber, light including a plurality of ray bundles through a first lens having a first surface and a second surface, and a second lens having a third surface and a fourth surface;
causing, by the first lens, the light output from the optical fiber to form an image at an image plane located at the third surface of the second lens; and
causing, by the second lens, subsets of the ray bundles received at the third surface of the second lens to intersect or overlap at a photodetector located at the fourth surface of the second lens in a smaller cross-sectional area than at the third surface of the second lens.

9. The method of claim 8, further comprising receiving, at the first lens, the light output from the optical fiber,
wherein a diameter of the first lens is at least $2\tan(\theta)d$, where $\theta$ is a numerical aperture of the optical fiber and $d$ is a distance between an output plane of the optical fiber and the first lens.

10. The method of claim 8, further comprising receiving, at the second lens, the light output from the first lens; and
outputting, from the second lens, light having a cross-sectional area at the fourth surface of the second lens that is smaller than a cross-sectional area at the first surface of the first lens.

11. The method of claim 8, wherein the first surface is a first convex surface, the second surface is a second convex surface, the third surface is a third convex surface, and the fourth surface is a fourth planar surface.

12. The method of claim 11, wherein the fourth surface is positioned at a focal length of the second lens.

13. The method of claim 12, wherein the second lens has a thickness between the third surface and the fourth surface that is equal to the focal length of the second lens.

14. The method of claim 8, further comprising deriving, by one or more processors, data from the light received at the photodetector.

15. An optical transceiver comprising:
an optical fiber configured to receive and transmit light;
a lens system including a first lens having a first surface and a second surface, and a second lens having a third surface and a fourth surface;
a photodetector located at the fourth surface of the second lens, the photodetector configured to receive the light and convert the received light into an electrical signal using a photoelectric effect; and
one or more processors configured to use the photodetector to derive data from the received light,
wherein the lens system is positioned between the optical fiber and the photodetector,
wherein the received light converges as it passes through the first lens due to a greater refractive index of the first lens and a curvature of the first lens,
wherein light output from the optical fiber includes a plurality of ray bundles, and
wherein subsets of the ray bundles received at the third surface of the second lens to intersect or overlap at the photodetector in a smaller cross-sectional area than at the third surface of the second lens.

16. The optical transceiver of claim 15, wherein the first lens is configured to receive the light output from the optical fiber, and
wherein a diameter of the first lens is at least $2\tan(\theta)d$, where $\theta$ is a numerical aperture of the optical fiber and $d$ is a distance between an output plane of the optical fiber and the first lens.

17. The optical transceiver of claim 15, wherein the second lens is configured to receive the light output from the first lens and to output light having a cross-sectional area at the fourth surface of the second lens that is smaller than a cross-sectional area at the first surface of the first lens.

18. The optical transceiver of claim 17, wherein the first surface is a first convex surface, the second surface is a second convex surface, the third surface is a third convex surface, and the fourth surface is a fourth planar surface.

19. The optical transceiver of claim 18, wherein the fourth surface is positioned at a focal length of the second lens.

20. The optical transceiver of claim 19, wherein the second lens has a thickness between the third surface and the fourth surface that is equal to the focal length of the second lens.

* * * * *